TRANSMISSION SYSTEM COMPRISING A TERMINAL STATION AND A RELAY STATION

Filed March 20, 1951

2 Sheets-Sheet 1

INVENTOR
Hendrik Cornelis Bennebroek Evertsz'

BY

AGENT

INVENTOR
Hendrik Cornelis Beenebroek Evertsz'
BY
AGENT

United States Patent Office 2,835,792
Patented May 20, 1958

2,835,792

TRANSMISSION SYSTEM COMPRISING A TERMINAL STATION AND A RELAY STATION

Hendrik Cornelis Bennebroek Evertsz, Hilversum, Netherlands, assignor, by mesne assignments, to North American Philips Company, Inc., New York, N. Y., a corporation of Delaware Application March 20, 1951, Serial No. 216,484

Claims priority, application Netherlands May 2, 1950

5 Claims. (Cl. 250—6)

The invention relates to transmission systems of the kind comprising a terminal station and a relay station for the transmission of intelligence signals, for example telephone, telex or telegraphy signals by means of carrier-wave pulses. The intelligence signals may be transmitted by various modulation methods, for example, by pulse position modulation, pulse duration modulation, or the like.

The invention is of particular advantage in beam transmitter systems for time-multiplex transmission of a plurality of intelligence signals by pulse position modulation.

In such transmission systems, the relay stations are frequently provided with a remote control-device; for this purpose the relay station comprises at least one switch to be actuated from the terminal station.

The object of the invention is to provide a particularly simple remote-control device in transmission systems of the said kind.

According to the invention, a transmission system comprising a terminal station and a relay station for the transmission of intelligence signals by means of carrier-wave pulses, in which the relay station comprises at least one switch to be controlled from the terminal station, is characterized in that the carrier wave modulated by a definite code frequency is transmitted as a switching signal in the intervals between successive pulses.

Figure 1:
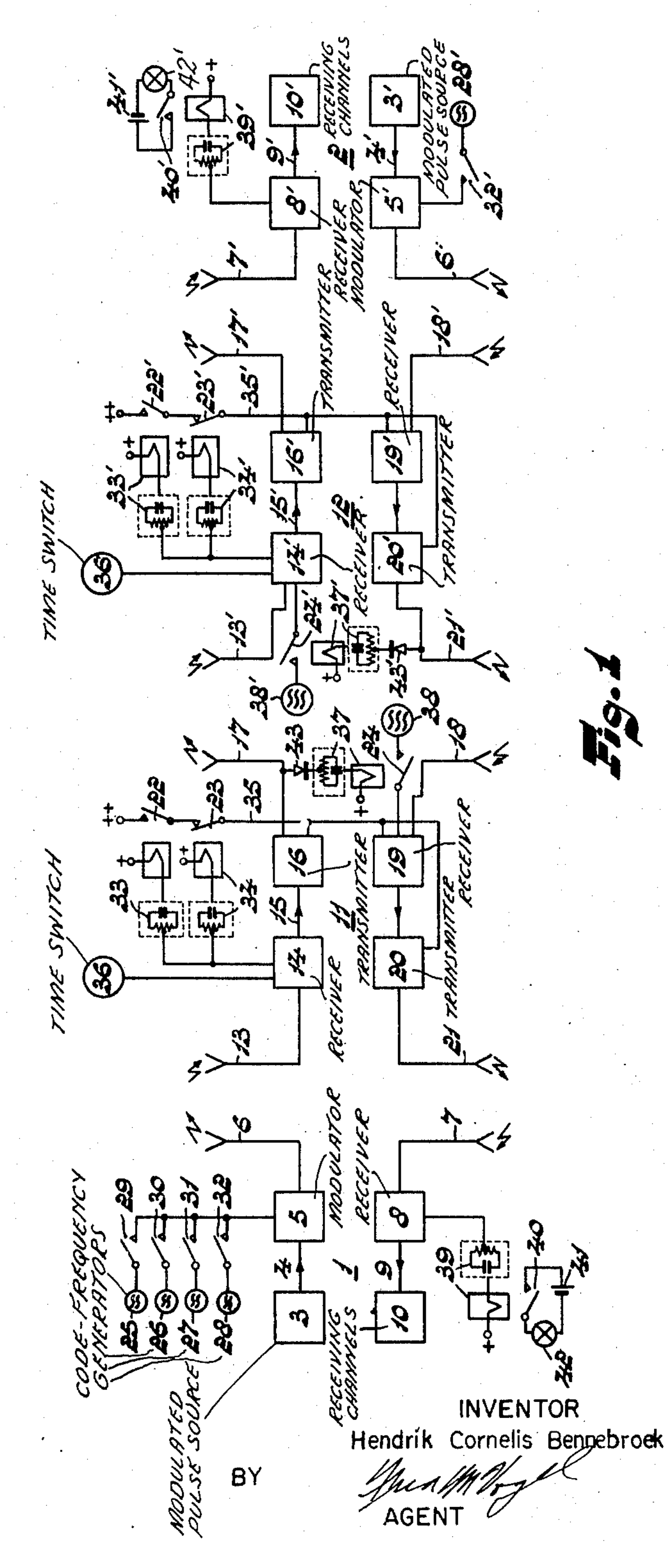
Figures 2, 3:
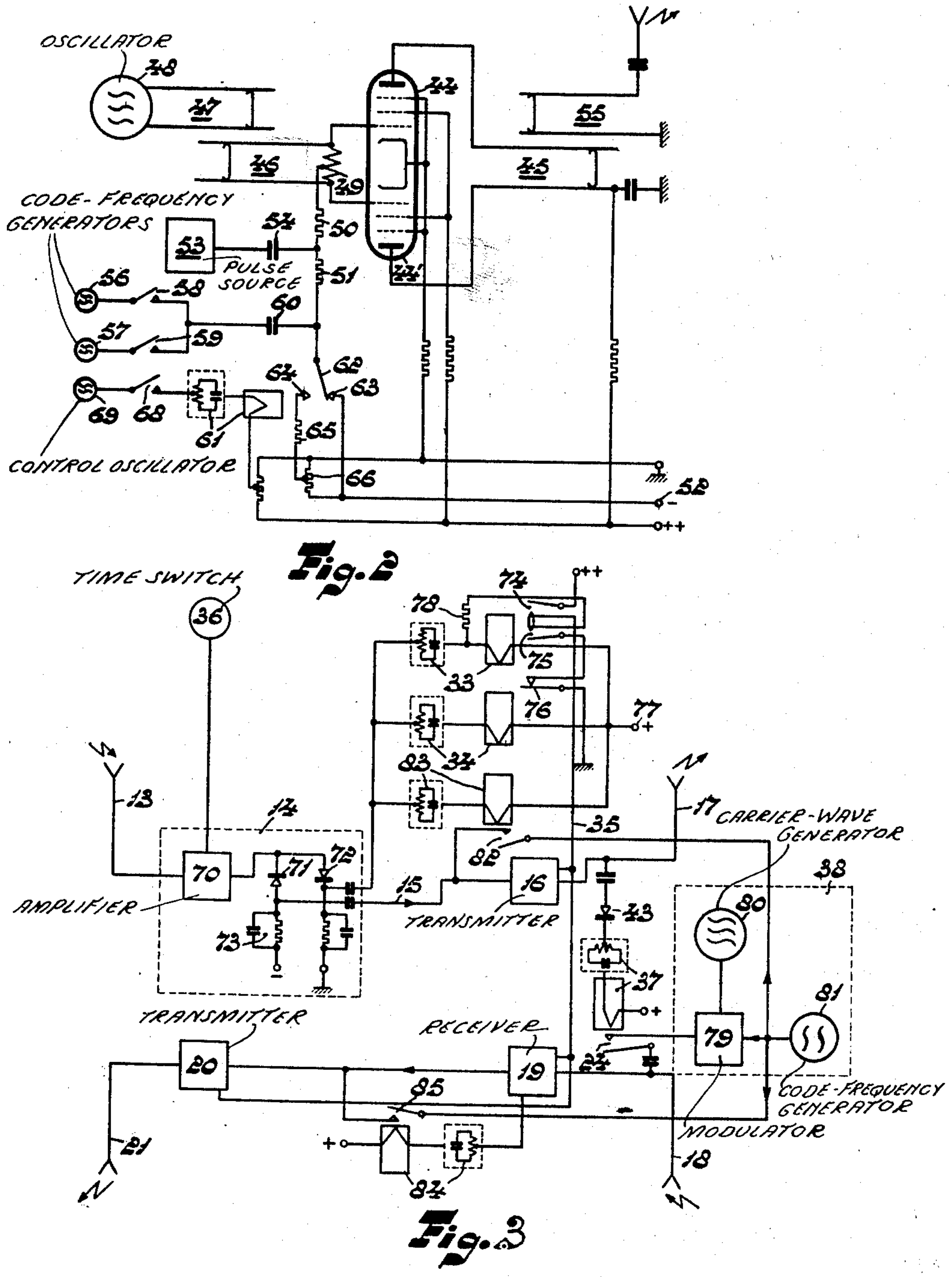

In order that the invention may be more clearly understood and readily carried into effect, it will now be described more fully with reference to the accompanying diagrammatic drawing, given by way of example, in which:

Fig. 1 is a block diagram of a duplex-communication transmission system according to the invention, Fig. 2 shows a transmitting device for use in a transmission system according to the invention and Fig. 3 shows a relay station for use in a transmission system according to the invention.

The transmission system shown in Fig. 1 comprises two co-operating terminal stations 1 and 2 for the transmission of signals in time multiplex with the use of pulse position modulation.

The transmitter cascade of a terminal station 1 comprises a stage 3 having, for example, several successively operative transmitting channels (not shown) comprising pulse position modulators, each of which is connected through a low-frequency amplifier to an associated microphone. The time multiplex pulses are taken from the stage 3 and applied through a line 4 to a carrier-wave modulating stage 5, which is common to all the channels. The carrier-wave pulses are emitted via an aerial 6.

The receiving cascade of the terminal station 1 comprises a stage 10 having a number of successively operative receiving channels corresponding with the number of transmitting channels, each of the receiving channels comprising a pulse position demodulator to which a reproducing device is connected.

The carrier-wave pulses received through an aerial 7, originating from the co-operating terminal station 2 are supplied, subsequent to amplification and detection in the receiving part 8 which is common to all the receiving channels, through a line 9 in parallel to the receiving channels of the stage 10, which are successively released.

The received and transmitted pulses are preferably modulated on carrier-waves of different frequencies, in order to avoid direct coupling between the transmitting and the receiving cascades.

The transmission of signals between the terminal stations 1 and 2 is effected through duplex communication relay stations 11 and 12.

Subsequent to high-frequency amplification and amplitude detection in the relay station receiver 14, the signals emanating from the transmitter at the terminal station 1 received through a receiver aerial 13 of the relay station 11 are supplied through a line 15 to a relay station transmitter 16 and a transmitting aerial 17. The carrier-wave pulses transmitted via the aerial 17 are supplied for further transmission to the relay station 12.

The relay station 11 also comprises a receiving aerial 18, a relay station receiver 19, a relay station transmitter 20 and a transmitting aerial 21 and co-operates with the receiver at the terminal station 1.

The relay station 11 comprises three switches 22, 23, 24 to be controlled from the terminal station 1, serving in the order indicated to switch on, switch off and supervise the relay station 11 respectively.

In the transmission system shown, the terminal station 1 is similar to the terminal station 2 and the relay station 11 is similar to the relay station 12. Similar elements of the terminal 1 and 2 and similar elements of the relay stations 11 and 12 are designated by the same reference numerals; to make a distinction the reference numerals associated with the elements of the terminal station 2 and the relay station 12 have accents.

A carrier-wave modulated by a definite code frequency is emitted as a switching signal in the intervals between successive pulses in order to provide that a simple remote-control device may be used. The terminal station 1 comprises four generators 25, 26, 27 and 28 for different code frequencies to be switched on at will, these generators being coupled through switches 29, 30, 31 and 32 with the modulator stage 5 of the transmitter of the terminal station 1 to produce switching signals. In numerical order, the code frequency generators 25 to 28 serve for switching on the relay station 11, switching on the relay station 12, switching off the relay stations 11 and 12 simultaneously and supervising the relay station 11, respectively.

The switches 22 and 23 to be controlled from the terminal station 1 form part of resonance relays 33 and 34 respectively tuned to the code frequencies of the code-frequency generators 25 and 26 and connected to the detector stage of the relay station receiver 14. The switches 22 and 23 forming part of the resonance relays 33 and 34, respectively, are, in this case, included in the supply voltage lead 35 of the relay station 11.

The system described so far operates as follows:

Initially, the receivers 14, 14′ of the relay stations 11, 12 are switched on by time switches 36, 36′.

Upon closing the switch 29, a switching signal is produced in the modulator stage of the transmitter at the terminal station 1. The carrier wave modulated by the frequency of the generator 25 is emitted as a switching signal in the intervals between successive pulses. The switching signal received through the aerial 13 is amplified and detected in the relay station receiver 14 and fed to the resonance relays 33 and 34. The resonance relay 33 is tuned to this code frequency and is thus energized, closing the switch 22 and thus switching on the relay station receiver 19 and the relay station transmitters 16 and 20.

The relay station 12 is switched on in a similar manner by a code frequency originating from the generator 26 with the use of the resonance relay 33′ and the associated switch 22′.

In order to hold the relay stations 11 and 12 in the operating condition after the switching signal has ceased, the resonance relays 33 and 33′ are provided with holding windings (not shown).

As stated above, the code frequency generator 27 of the terminal station 1 serves to switch off the two relay stations 11 and 12. The switching signal for the switching-off relay 34′ is supplied to the relay station 12 after having been relayed by the relay station 11. It is, in this case, necessary that the resonance relay 34 associated with the relay station 11 should be slower to respond than the resonance relay 34′ of the relay station 12.

For supervising the relay station 11, the relay station 11 comprises a part having a resonance relay 37 responding to the code frequency of the generator 28 and the switch 24 to switch on a local switching-signal generator 38, which comprises, for example, a modulator stage, a local carrier-wave generator connected thereto and a local code frequency generator. The output of the generator 38 is connected through the switch 24 forming part of the resonance relay 37 to the receiver 19 of the relay station 11, whilst the terminal station receiver 8 comprises a supervisory device responding to the code frequency of the code frequency generator 38. The supervisory device comprises a resonance relay 39 connected to the detector of the terminal station receiver 8 and a switch 40, which is included in the current circuit of a battery 41, having a signalling lamp 42, which is ignited on the generator 28 being switched on if the relay station 11 is operating satisfactorily.

The supervision of the relay station 12 is effected from the terminal station 2 in an exactly similar manner with the use of the generator 28′. It should be noted that the supervision of the relay station 12 may as an alternative, be effected from the terminal station 1.

It should be noted here that in the transmission system described above use may be made of relay stations of a different type, for example, in the receiving part the incoming signals may be transposed to an intermediate frequency, these oscillations being retransposed in the transmitter part, subsequent to intermediate-frequency amplification, to carrier-wave frequency. In this case, the resonance relays to be actuated from the terminal stations may be connected through an amplitude detector to the intermediate-frequency amplifier of the relay station.

Fig. 2 shows a preferred terminal station transmitter for use in a transmission system according to the invention, comprising a push-pull class C modulator stage which is normally cut off by negative grid voltage.

The modulator stage comprises two push-pull connected pentodes 44 and 44′ having a tunable Lecher output circuit 45 and a tunable Lecher input circuit 46. The input circuit 46 is inductively coupled with the output circuit 47 of a carrier-wave oscillator 48. The control-grids of the pentodes are connected one to each end of a coil 49, connected in parallel with the modulator input circuit 46, the central tapping of this coil being connected through the series combination of a resistor 50 and a resistor 51 to the negative terminal 52 of a grid bias voltage battery.

The pulse-shaped modulation voltage is taken from a stage 53, which is connected through a capacitor 54 to the point of connection between the resistors 50 and 51.

Each time a pulse-shaped modulation voltage is supplied from the stage 53, the pentodes 44 and 44′ are released for a short time to produce corresponding carrier-wave pulses, which are fed to an aerial circuit 55 inductively coupled with the output circuit 45.

For producing the switching signals, the terminal station transmitter comprises two code frequency generators 56 and 57, which are connected to the end of the resistor 51 adjacent the negative grid voltage battery, through switches 58 and 59 and through a capacitor 60. When in the circuit-arrangement described above the switches 58 and 59 are closed, part of each positive period of oscillations of code frequency is transmitted; the distorted transmission of the oscillations of code frequency does not, in general, constitute an objection to remote control.

If desired, a greater part of the oscillations of code frequency may be transmitted; the negative grid bias voltage of the pentodes 44 and 44′ must, in this case, be temporarily reduced. For remote control, a switch 62 forming part of a resonance relay 61, having contacts 63 and 64 is included in the negative grid voltage line; contact 63 is connected directly to the negative terminal 52 of the grid voltage battery, whereas contact 64 is connected through a resistor 65 to a potentiometer 66 connected between the negative grid voltage terminal 52 and earth. In order to change over the switch 62 the resonance relay 61 is connected via a switch 68 to a control-oscillator 69.

The reduction of the negative grid bias voltage may be chosen so that a substantially undistorted transmission is provided; this may be utilised for service messages and the like, i. e. messages in connection with checking and maintenance of the apparatus.

Fig. 3 is a detail view of a relay station, which is substantially similar to the relay station 11 shown in Fig. 1. Similar elements are designated by the same reference numerals in Figures 1 and 3.

The relay station receiver 14 comprises a stage 70 having high- and intermediate-frequency amplifiers, with the output circuit of which are connected in parallel an amplitude detector 71 comprising a negatively biased rectifying cell and an amplitude detector 72 comprising a rectifying cell.

The output impedance 73 of the amplitude detector 71 operating at the same time as a threshold device is connected through the line 15 to the relay station transmitter 16; by the use of the amplitude detector 71, 73 operating as a threshold device, switching signals, the amplitudes of which are much smaller than those of the pulses to be transmitted, are completely suppressed.

The switching-on relay 33 comprises a holding circuit and two mechanically coupled contacts 74 and 75, contact 74 being included in the supply voltage lead 35 of the relay station. The holding circuit of the resonance relay 33 is formed from the positive terminal 77 of an energizing current source, through relay 33, resistor 78, contact 75, break contact 76 of relay 34 to earth.

When the resonance relay 33 responds to a switching signal from the terminal station, the relay station is switched on and the holding circuit 75 to 78 is completed; the resonance relay 33 remains energized, even when the switching signal has ceased.

When the resonance relay 34 is energized by a switching signal from the terminal station, the relay is energized, interrupts the holding circuit of the resonance relay 33 and thus switches off the relay station.

Supervision of the relay station is effected in the manner described above with the use of the local code frequency generator 38, which is connected by the resonance relay 37 to the input circuit of the relay station receiver 19. The switching signal generator 38 comprises a modulator 79, a carrier-wave generator 80, a code-frequency generator 81, the modulator 79 supplying a modulated supervisory high-frequency signal.

The use of the amplitude detector operating at the same time as a threshold device 71, 73 necessitates particular measures to cause the resonance relay 37 connected to the relay station transmitter 16 to respond.

In order to control the resonance relay 37, the code frequency generator 81 is connected through a switch 82, which forms part of a resonance relay 83 connected to the detector stage 72, to the input of the relay station transmitter 16. Under the control of a switching signal from the terminal station transmitter, the resonance relay 83 responds, so that in the relay station transmitter the local switching signal of the generator 81 energizes the relay 37 through the transmitter 16 and a detector 43, after which the high-frequency supervisory signal is fed through the switch 24 to an input of the relay station receiver. The supervisory signal from the receiver 19 energizes resonance relay 84, so that the switching signal of the generator 81 is supplied through the relay contact 85 to the transmitter 20 and transmitted.

As an alternative, the control of the resonance relay 37 from the terminal station transmitter may be effected by using a switch included in the threshold voltage lead of the rectifying cell 71 and which causes the threshold voltage to be temporarily inoperative, when a resonance relay connected to the detector stage 72 responds.

What I claim is:

1. A transmission system comprising a terminal station and a relay station for the transmission of intelligence signals by means of intelligence-modulated carrier wave pulses, said terminal station comprising a carrier wave source and modulator means for producing said intelligence-modulated carrier wave pulses, the durations of said pulses being short as compared to the time intervals between successive pulses, a code frequency generator for producing a switching signal comprising said code frequency and having a relatively long time duration which is at least as great as said time intervals between successive pulses, means connected to amplitude-modulate said carrier wave with said switching signal so as to generate a continuously occurring code-frequency modulated carrier wave during the occurrence of said switching signal and hence continuously during the time intervals between pulses, said relay station comprising a switching relay to be actuated by said switching signal, receiver means for receiving said modulated carrier wave, and a filter for passing only said code frequency and connected between said receiver means and said switching relay whereby said switching relay is actuated upon the occurrence of said switching signal.

2. A system as claimed in claim 1, in which said modulator means comprises an electron discharge tube having a cathode, a grid and an anode, a source of said intelligence-modulated pulses connected to said grid, a code switch connected between said code frequency generator and said grid to selectively apply said switching signal to said grid, means connected to bias said grid normally to cut-off, and a circuit including said code switch to reduce the value of said bias when said switching signal is applied to said grid.

3. A system as claimed in claim 1, in which said relay station further comprises a transmitter and a source of voltage supply for said transmitter, said switching relay comprising a switch connected between said transmitter and said source of voltage supply, whereby when said switching relay is actuated voltage from said voltage source is applied to said transmitter, said switching relay including a holding circuit therefor.

4. A system as claimed in claim 1, in which said terminal station includes means selectively to transmit a plurality of code signals each having a different frequency, and in which said relay station includes a plurality of resonant relays respectively responsive solely to the various frequencies of said code signals.

5. A system as claimed in claim 1, in which said relay station comprises a transmitter adapted to retransmit the signals received by said receiver means, said system including a second relay station having receiver means for receiving signals retransmitted by the first-named relay station and including a switching relay, and a filter for passing only said code frequency and connected between said last-named receiver means and said last-named switching relay, the first-named said switching relay having a slower response characteristic than that of said last-named switching relay.

References Cited in the file of this patent

UNITED STATES PATENTS

| | | |
|---|---|---|
| 2,112,877 | Beverage | Apr. 5, 1938 |
| 2,155,821 | Goldsmith | Apr. 25, 1939 |
| 2,250,950 | Goldsmith | July 29, 1941 |
| 2,266,194 | Guanella | Dec. 16, 1941 |
| 2,305,496 | Roberts | Dec. 15, 1942 |
| 2,333,992 | Fox | Nov. 9, 1943 |
| 2,345,951 | Smith | Apr. 4, 1944 |
| 2,401,333 | Bumstead | June 4, 1946 |
| 2,517,891 | Laesser | Aug. 8, 1950 |
| 2,520,534 | Edson | Aug. 29, 1950 |
| 2,532,310 | Homrighous | Dec. 5, 1950 |
| 2,532,719 | Homrighous | Dec. 5, 1950 |
| 2,616,080 | Homrighous | Oct. 28, 1952 |